United States Patent

[11] 3,612,650

[72] Inventors Shizuo Miyano;
 Asaji Kondo, both of Asaka-shi, Japan
[21] Appl. No. 855,174
[22] Filed Sept. 4, 1969
[45] Patented Oct. 12, 1971
[73] Assignee Fuji Photo Film Co., Ltd.
 Kanagawa, Japan
[32] Priority Sept. 4, 1968
[33] Japan
[31] 43/63487

[54] PROJECTION SCREEN
 13 Claims, 3 Drawing Figs.
[52] U.S. Cl. ................................................. 350/126,
 117/132 C
[51] Int. Cl. ......................................... G03b 21/60
[50] Field of Search .......................................... 350/126;
 352/61, 86; 117/132 C

[56] References Cited
UNITED STATES PATENTS

| | | | |
|---|---|---|---|
| 2,180,113 | 11/1939 | Land ............................ | 350/126 |
| 2,271,614 | 2/1942 | Baselt .......................... | 350/126 |
| 2,906,169 | 9/1959 | Saffir ........................... | 350/126 X |
| 2,932,581 | 4/1960 | Harkness et al. ............. | 350/126 X |
| 3,196,741 | 7/1965 | Takahashi .................... | 350/126 |
| 3,279,313 | 10/1966 | Kowalik et al ............... | 350/126 |
| 3,355,311 | 11/1967 | Gosselink ..................... | 350/126 UX |
| 3,383,153 | 5/1968 | Vetter .......................... | 350/126 |
| 3,398,018 | 8/1968 | Walters ........................ | 117/132 X |

Primary Examiner—Louis R. Prince
Assistant Examiner—Joseph W. Roskos
Attorney—Sughrue, Rothwell, Mion, Zinn & Macpeak ABSTRACT: A reflection-type projection screen comprising a support, the surface of which has a metallic luster, having coated thereon a light scattering layer comprising oil-containing microcapsules and a binder.

PATENTED OCT 12 1971  3,612,650

INVENTORS
SHIZUO MIYANO
ASAJI KONDO

BY Sughrue, Rothwell, Mion,
Zinn & Macpeak
ATTORNEYS

3,612,650

PROJECTION SCREEN

BACKGROUND OF THE INVENTION

1. Field of the Invention

This invention relates to a projection screen, and more particularly to a projection screen of the reflection type comprising a support having a reflection surface of metallic luster, and a light scattering layer containing microcapsule-type particles coated on said support, whereby projected images having sufficient brightness and reduced scintillation can be observed in a light room.

2. Description of the Prior Art

A movie film or a transparent positive film has been generally appreciated by projecting it on a screen and observing the reflected images thereof.

This application is usually carried out in a dark room because the efficiency of the screen is insufficient. Namely, as a prior art screen, there has been used an opaque matted base such as a paper surface, cloth surface and resin surface containing a white pigment. Therefore, the projected light scatters in all directions and does not effectively come into sight of the observers. Consequently, the brightness of the projected image is low. If such a screen is used in a light room, the contrast of the image becomes very poor because the ambient light is uniformly applied to the screen, which does not satisfy the demand of the observers. Thus, it is sometimes necessary, though undesirable, to darken a circumference in order to increase the contrast of the image. It would be very advantageous if the projection could be carried out in a light room.

The principal object of the present invention is to provide a reflection screen by which bright images may be observed in light room, by providing a surface which reflects a greater portion of the projected light and scatters the reflected light.

SUMMARY OF THE INVENTION

The above object is attained by providing a light scattering layer having a thickness of from 5 microns to 100 microns on a light reflective support having a metallic luster surface. Such a light scattering layer comprises a transparent continuous phase and finely divided particles dispersed therein in the form of microcapsules which have a different refractive index from that of the continuous phase. The form of the microcapsules is such that a transparent or semitransparent granular core material is surrounded and protected by a film forming polymer material as the film. The utilization of such microcapsules as the light scattering element is the essence of this invention.

DETAILED DESCRIPTION OF THE INVENTION

Figure 1:
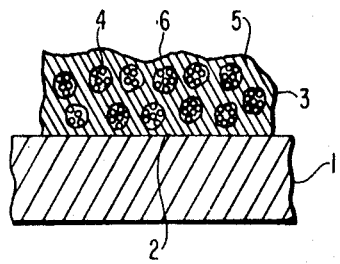
FIG. 1 is a cross-sectional view showing an embodiment of the projection screen of the invention.

In FIG. 1, a light scattering layer 3 is laid on a support 1 having a metallic luster surface 2 which reflects the light. This light scattering layer is composed of microcapsules 4 and a binder 5. The surface thereof 6 is not smooth but is uneven due to the microcapsules.

Figure 2A:
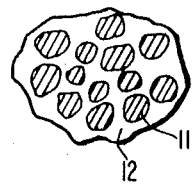
FIGS. 2a and 2b are cross-sectional views showing different embodiments of the microcapsules as the light scattering element of the invention.
Figure 2B:
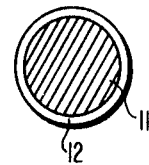

FIG. 2 shows in detail the microcapsule 4 shown in FIG. 1. In the Figure, (a) is a microcapsule in which a plurality of particles 11 is surrounded by a polymer film 12, and (b) is a microcapsule in which only one particle 11 is surrounded by a polymer film 12.

As the support having the metallic luster which may be used in this invention, there may be illustrated: plates, foils, plating films and vacuum-deposited films of aluminum, zinc, tin, nickel, chromium or stainless steel; a gold plate; a silver plate; a silver mirror surface and a silver yarn woven cloth. Aluminum is especially advantageous because of its low price and large reflective ratio. A special screen which has directivity for the reflected light can be produced if an aluminum plate or foil is utilized which is obtained by compressing rolling two aluminum plates in facing relationship with one another and then separating the two aluminum plates. Namely, when parallel light rays are applied to the surface having fine lines formed in one direction by the above rolling, the light rays are reflected at a direct-angled phase of the lines and the scattering of the light rays in the phase including the lines is low.

The light scattering layer of this invention is composed of microcapsules and a binder.

As the core material of the microcapsules, there may be used transparent or semitransparent materials, for example, inorganic materials such as glass and silica, synthetic polymer resins such as polystyrene, polyamide, polyester and vinyl resins, solvents having a high boiling point such as tricresyl phosphate, dibutyl phthalate and silicone and solutions of polymers dissolved in a solvent having a high boiling point, which are used in a grain size of from 1 micron to 100 microns.

Film forming polymers are employed in order to produce the microcapsules by forming a surrounding film around the core material. In order to make the microcapsules using such polymers, a well-known method represented in, for example, Yakuzaigaku, Vol. 26, p. 1–7 (1966) by Asaji Kondo, can be utilized.

In order to produce microcapsules from an aqueous solution by phase separation, a method mentioned in U.S. Pat. No. 2,800,457 is utilized, wherein water-soluble proteins having an isoelectric point are preferably used together with polymers having acid groups and surface active agents, for example, gelatin, casein, albumin, water-soluble collagen, gum arabic, sodium arginate, agaragar, dextran sulfate, polyvinyl methyl ether, a copolymer of polyethylene and maleic anhydride and sodium polyvinyl benzene sulfonate. Further, when the microcapsules are produced from an organic solvent solution by a phase separation method or a polymerization method, water-soluble vinyl polymers, cellulose, polyamide, polyester, urethane and polyurea may be used as the film forming polymer.

Furthermore, a spray drying method can be effectively utilized. The amount of the core material should be in the range of from 0.1 to about 10 times by weight of the film forming material.

As the binder for the microcapsules in the light scattering layer, though known water-soluble or organic solvent soluble materials can be used, gelatin, polystyrene, polyvinyl acetal, cellulose derivatives and saran are more useful, In such a binder, it is preferable to have a refractive index different from that of the core material, and more preferably, over 0.02 difference. The ratio of the microcapsules and the binder can be determined experimentally of about 1:2, by weight, so that a metallic luster surface is not visible therethrough. In general, as the film thickness of the light scattering layer increases, the light of the screen decreases. On the contrary, if the film is too thin the quality of the screen deteriorates because a large amount of light is directly reflected by the metallic luster surface to cause glittering and hot spots. Accordingly, 5–100 microns of film thickness is suitable.

When the screen is used for projection of a color film, the light scattering layer may be colored in neutral gray or another color at 0.1–0.5 of a reflection concentration. By coloring the light scattering layer, spreading of the light in the light scattering layer is prevented, and consequently very distinct projected images can be obtained.

Further, if a light scattering powder such as a finely divided aluminum powder is added to the light scattering layer, a screen having peculiar brightness and quality is obtainable.

The desirable characteristics of this invention will be further described below:

1. It is possible to use the screen in a light room since the brightness is over 10 times larger than that of a prior screen.

This is because the metallic luster surface which reflects the light is used as the support.

2. The light scattering property of the screen does not decrease as much as that of the prior art screen. This is because microcapsules are used.

3. A surface of the light scattering layer is naturally matted and the quality of the reflected images is improved due to the use of microcapsules.

4. Production of the screen is easily carried out since the grain size of the microcapsules is easily controllable during production thereof.

5. The microcapsule itself is an excellent light scattering element as compared with a simple particle, since the microcapsule itself is a kind of double refractive matter.

6. The screen is hard to scratch since the light scattering layer forms a tough film.

The present invention will be further illustrated by the following examples:

EXAMPLE 1

Production of microcapsules:

18 g. of tricresyl phosphate was dispersed in 180 g. of a 10 percent gelatin solution to prepare dispersed particles having a grain size of 0.5–0.2. After mixing this emulsion with 1.8 liters of a 1 percent aqueous gum arabic solution, 35 ml. of a 2.5 percent aqueous acetic acid solution was added to the mixture with stirring while keeping the liquid at 40° C. Thus, oil-containing coacervation drops having a grain size of 7–8$\mu$ were obtained. After cooling to 5° C., 20 ml. of formalin was added to the system, then, a 10 percent aqueous solution of sodium hydroxide was added dropwise with stirring to increase the pH of the system to 9. After letting it stand for a night, a top liquid was removed to obtain 700 g. of hardened capsule slurry. Into this slurry, 800 g. of 7 percent gelatin containing a small amount of a viscous agent and a hardening agent was added as the binder, and then water was added so as to make the total amount 2 liters to prepare a coating.

EXAMPLE 2

Production of a reflection screen:

120 g. of the above-mentioned coating was applied to a mirror surface of aluminum deposited on a polyester film (125 microns thickness produced by Toyo Rayon Co., Ltd.: commercial name: Metalmi) having a size of 40 cm. × 50 cm.

240 g. of the coating in Example 1 was applied to a rolling aluminum plate having a 0.2 mm. thickness, 60 cm. × 80 cm. (produced by Sumitomo Metal Industries, Ltd.) and dried. This aluminum plate had fine lengthwise stripes thereon, which had a characteristic that scattering of the light in a cross direction was larger than that in a lengthwise direction.

EXAMPLE 3

Microcapsules were produced by the same procedure as in Example 1 but using a 10 percent toluene solution of polystyrene instead of tricresyl phosphate, which were then applied to a Metalmi film to produce a screen. The screen had a somewhat white appearance as compared with that in Example 1. When this screen was used in a room lacking in light, good results were obtained.

EXAMPLE 4

Production of microcapsules:

50 g. of dibutylphthalate and 100 g. of terephthalic chloride were dissolved in 300 ml. of toluene. This solution was dispersed in 1.5 liters of 1.5 percent polyvinyl alcohol to form an emulsion having a grain size of 3–5$\mu$. On the other hand, a solution was produced by dissolving 35 g. of ethylenediamine and 40 g. of caustic soda in 300 ml. of water. This aqueous solution was added dropwise to the emulsion at room temperature with stirring. Thus, dibutylphthalate-containing polyamide capsules having a grain size of 5–6$\mu$ were formed. After filtration and washing with water, the resulting capsules were dried.

Production of a screen:

As the binder, a solution was used which was produced by dissolving 50 g. of polyester resin, Vitel PE–200 (trade name, produced by Goodyear Tire & Rubber Co.) in a mixture of 50 g. of methylethylketone, 20 g. of cellosolve acetate, 30 g. of toluene and 50 g. of xylene. Into this solution, 25 g. of the microcapsules described above was dispersed. The dispersion was applied to the Metalmi film and dried. The amount of application was 6 g. per 100 cm$^2$.

What is claimed is:

1. A reflection-type projection screen comprising a support, the surface of which has a metallic luster, having coated thereon a light scattering layer having a thickness of from 5 to 100 microns consisting essentially of microcapsules dispersed in a transparent continuous binder phase, said microcapsules consisting essentially of transparent or semitransparent granular core material surrounded by a film forming polymer material, wherein the refractive index of said microcapsules is different from that of said binder phase.

2. The reflection-type projection screen as in claim 1 wherein the film forming polymer material of said microcapsules is gelatin.

3. The reflection-type projection screen as in claim 1 wherein said support is selected from the group consisting of an aluminum plate and aluminum foil which is obtained by compressively rolling two aluminum plates in facing relationship with one another and separating said two aluminum plates.

4. The reflection-type projection screen as in claim 1 wherein said core material is selected from the group consisting of tricresyl phosphate, silicon and dibutyl phthalate.

5. The reflection-type projection screen as in claim 1 wherein said binder is selected from the group consisting of gelatin, polystyrene, polyvinyl acetal, a cellulose derivative and a vinylidene chloride-vinyl chloride copolymer.

6. The reflection-type projection screen as in claim 1 wherein the core of said microcapsules varies in size from 1 micron to 100 microns.

7. The reflection-type projection screen as in claim 1, wherein the core material of said microcapsules is present in a ratio of from 0.1 to 10 parts, by weight, of the film forming material of said microcapsules.

8. The reflection-type projection screen as in claim 1 wherein the weight ratio of said microcapsules to said binder is about 1:2.

9. The reflection-type projection screen as in claim 1 wherein said binder differs in refractive index from the core material of said microcapsules by at least 0.02.

10. A reflection-type projection screen as in claim 1 wherein said support comprises aluminum.

11. The reflection-type projection screen as in claim 1 wherein said core material is an inorganic material selected from a group consisting of glass and silica.

12. The reflection-type projection screen as in claim 1 wherein said core material is a synthetic polymer resin selected from the group consisting of polystyrene, polyamide, polyester and vinyl resins.

13. The reflection-type projection screen as in claim 1 wherein said core material is a solution of a polymer dissolved in a solvent having a high boiling point.